US 6,597,310 B2

(12) United States Patent
Itoh et al.

(10) Patent No.: US 6,597,310 B2
(45) Date of Patent: Jul. 22, 2003

(54) COLLECTION/DELIVERY NAVIGATION SYSTEM

(75) Inventors: Masakazu Itoh, Kamakura (JP); Manabu Miyatake, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/988,211

(22) Filed: Nov. 19, 2001

(65) Prior Publication Data

US 2002/0044084 A1 Apr. 18, 2002

Related U.S. Application Data

(63) Continuation of application No. 09/056,644, filed on Apr. 8, 1998, now Pat. No. 6,335,702.

(30) Foreign Application Priority Data

Apr. 10, 1997 (JP) .............................. 09-092114

(51) Int. Cl.⁷ .............................. G01S 5/02; H04B 7/185
(52) U.S. Cl. .................................. 342/357.01; 701/201
(58) Field of Search ..................... 342/357.01; 701/201, 701/202, 209

(56) References Cited

U.S. PATENT DOCUMENTS

| | | | |
|---|---|---|---|
| 5,444,444 A | 8/1995 | Ross | ........................... 340/994 |
| 5,804,810 A | 9/1998 | Woolley et al. | ............. 235/492 |
| 5,862,509 A | 1/1999 | Desai et al. | ................. 701/209 |
| 5,875,412 A | 2/1999 | Sulich et al. | ................ 701/207 |
| 5,978,771 A | 11/1999 | Vandivier, III | .................. 705/8 |

FOREIGN PATENT DOCUMENTS

JP      6-111197      4/1994

Primary Examiner—Theodore M. Blum
(74) Attorney, Agent, or Firm—Mattingly, Stanger & Malur, P.C.

(57) ABSTRACT

A collection/delivery work support system which can eliminate erroneous delivery of goods, missing delivery and missing collection in collection/delivery service to greatly improve the efficiency of collection of goods. A collection/delivery navigation system for determining and indicating a route for delivery and collection of goods and managing collection and delivery conditions has an electronic slip which stores information described in a slip of a commodity and has a function of transmitting the stored information in response to an external request for information, and a navigation unit for indicating a route for collection and delivery of goods and collection and delivery conditions. The navigation unit has a reader for reading the information stored in the electronic slip, a delivery information table for storing delivery information inclusive of a delivery destination and delivery conditions, a collection information table for storing collection information inclusive of a collection destination and collection conditions, a collection/delivery route generation unit for generating a route for collection and delivery by using the delivery information and the collection information, and an indication device for indicating the collection/delivery route, the delivery information and the collection information.

4 Claims, 6 Drawing Sheets

| DELIVERING GOODS INFORMATION PICTURE | |
|---|---|
| ADDRESS | HONGOU BUILDING, 2-1, YUKIGAOKA KAMAKURA-SHI |
| NAME | YAMADA KAORU |
| TELEPHONE NUMBER | 0467-88-1234 |
| GOODS NAME | SALMON |
| WEIGHT | 12kg |
| NOTES | COOL DOOR-TO-DOOR COURIER SERVICE |

FIG. 8

COLLECTING GOODS INFORMATION PICTURE

ADDRESS: SHONAN HEIGHTS 21,5-3,DAIBUTU, KAMAKURASI

NAME: MATUMOTO MATIKO

TELEPHONE NUMBER: 0467-88-1234

GOODS NAME: CLOTHES  ?

NOTES: COLECTION AT 15:00 IS DESIRED

FIG. 9

| SLIP NUMBER | ADDRESS | NAME | DELIVERY CONDITIONS |
|---|---|---|---|
| 213-5678 | HONGO BUILDING 201,2-1, YUKIGAOKA,KAMAKURA-SHI | YAMADA KAORU | 9:37 DELIVERY COMPLETED |
| 254-2216 | CORPO ASADA,3-22, YUKIGAOKA,KAMAKURA-SHI | YAMAUTI TUKASA | 9:57 DELIVERY COMPLETED |
| 556-578 | KINKI MOKKO,6-55, MINAMI AIDA,KAMAKURA-SHI | KAMIZONO YASUHIDE | 10:23 BRING-BACK GOODS (ABSENCE) |
| 221-112 | BUTIQUE KANA,5-23, HIGASI AIDA,KAMAKURA-SHI | SEKI KANAKO | 10:51 DELIVERY COMPLETED |
| 223-998 | YU BUILDING,5-23, HIGASI AIDA,KAMAKURA-SHI | SHIOMI TATSUNORI | 11:11 DELIVERY COMPLETED (SUBSTITUTE) |
| 247-554 | SASAKI HEIGHTS 603,5-1, DAIBUTSU,KAMAKURA-SHI | KAMEYA KAORU | UNDELIVERED |
| 556-111 | SITAMURA TEKKOSYO,5-88, DAIBUTSU,KAMAKURA-SHI | SITAMURA EIJI | UNDELIVERED |

COLLECTION/DELIVERY NAVIGATION SYSTEM

This is a continuation application of U.S. Ser. No. 09/056,644 filed Apr. 8, 1998, now U.S. Pat. No. 6,335,702.

BACKGROUND OF THE INVENTION

The present invention relates to a collection/delivery navigation system and a method for accurately and quickly grasping collection/delivery information necessary for collection and delivery of goods and more particularly, to a technique which is effective when applied to a collection/delivery navigation system adapted to determine and indicate a route through which delivery and collection of goods can be carried out efficiently and to manage collection/delivery conditions.

In a conventional navigation system, a person who collects and delivers goods (for simplicity, referred to as "a distributor") by using a distribution vehicle makes a paper plan of collection/delivery route by watching a slip or an instruction liaison notice for collection attached to a commodity and as a result, much time is consumed to determine a collection/delivery route.

In recent years, a system has been realized which can automatically make a collection/delivery route by processing precedently-known information concerning a delivery destination and a collection destination by means of a personal computer (PC) and can offer materials of the made route to a distributor. Another system is available in which information concerning delivery of goods is once registered in an electronic slip and is then registered in a navigation unit to permit navigation.

For example, JP-A-6-111197 discloses this type of navigation system, according to which goods delivery information represented by position information of a delivery destination is stored, in terms of longitude and latitude, in an electronic slip when delivery of a commodity is carried out and a map displayed on a navigation unit issues a delivery instruction by consultation with a map displayed thereon.

In the conventional navigation system, however, goods information represented by only the longitude and latitude information and ID information of a slip is inputted, thus raising a problem that detailed information about a delivery destination such as a residence address and a contact address cannot be obtained.

Further, in practical goods collection/delivery service, it is frequent that in addition to delivery, collection is also carried out and besides, an instruction of additional collection is issued in the course of delivery and collection. But in the conventional navigation system, only the process of delivery of goods is conducted and therefore, that navigation system can be applied to only delivery service. Even if the conventional navigation system is applied to delivery or collection service, there arises a problem that completion of goods delivery or collection cannot be determined when a delivery destination or a collection destination is absent. In other words, in the conventional system, determination of bring-back goods and uncollectible goods cannot be dealt with.

Further, in the navigation unit of the conventional navigation system, only the position information of a commodity is indicated in the form of a pointer such as mark, raising a problem that detailed goods information such as residence address and telephone number of a goods delivery destination cannot be known until a person in service goes to a luggage compartment of a vehicle and confirms a slip attached to the commodity lying in the luggage compartment.

SUMMARY OF THE INVENTION

An object of the present invention is to provide collection/delivery navigation system and method which can eliminate erroneous delivery, missing delivery and missing collection of goods in goods collection/delivery service to greatly improve the efficiency of goods collection and delivery, and to provide a recording medium which stores a program for execution of the method.

According to a typical aspect of the present invention, a collection/delivery navigation system includes in combination an electronic slip, attached to a commodity, which stores information described in a slip of the commodity and has a function of transmitting the stored information in response to an inquiry request from an external device such as a contactless reader of a distribution vehicle and a navigation unit for indicating a collection/delivery route and collection/delivery conditions for the commodity. The navigation unit stores information necessary for collection and delivery and has means for indicating the stored information in the form of a display on a screen and/or a voice.

In a collection/delivery navigation system according to another aspect of the present invention, the electronic slip, which stores information described in a slip of a commodity and has a function of transmitting the stored information in response to an external request for information, stores detailed information described in the slip of the commodity such as residence address, name and telephone number of a recipient or customer, goods name, weight and charge fee, as they are.

The navigation unit for indicating a collection/delivery route and collection/delivery conditions for the commodity has a reader, a delivery information table, a collection information table and a radio receiver set, transmits an inquiry signal from the reader to the electronic slip attached to the commodity, and receives information necessary for the delivery of the commodity, included in the information stored in the electronic slip, from the electronic slip to store it in the delivery information table. The navigation unit also receives information necessary for collection transmitted from a collection instruction unit at a distribution center through the radio receiver set to store it in the collection information table. In an alternative, the electronic slip may store only a master code of a goods slip and in connection with the master code read out of the reader, the navigation unit may communicates with the distribution center to obtain detailed information of the slip.

Collection/delivery route generating means of the navigation unit generates a route through which collection and delivery is carried out by using the delivery information and collection information stored in the delivery information and collection information tables, respectively, and indicates the generated collection/delivery route on an indication or display device.

When a distributor does collection/delivery service in accordance with the collection/delivery route indicated on the display unit, the navigation unit consults the goods information from the reader provided in the distribution vehicle to store delivery conditions and collection conditions in the delivery information and collection information tables, respectively, in accordance with collection/delivery service conditions and displays, as necessary, the delivery information including a delivery destination and delivery conditions and the collection information including a collection destination and collection conditions.

As described above, according to the collection/delivery navigation system of the present invention, information required for the operator of the distribution vehicle including a goods collection/delivery route, detailed information such residence address and contact address, delivery conditions and conditions of collection, inclusive of bring-back goods can be offered in conformity with the two modes of delivery/ collection service, that is, delivery and collection, thereby ensuring that erroneous delivery of goods, missing delivery and missing collection can be eliminated in goods collection/delivery service and the efficiency of goods collection can be improved greatly.

Other objects, features and advantages of the present invention will become apparent from reading of the following description of the embodiments of the invention taken in conjunction with the accompanying drawings.

BRIEF DESCRIPTION OF THE DRAWINGS

FIG. 8 is a diagram showing an example of display of a collection goods information picture in the present embodiment.

FIG. 9 is a diagram showing an example of display of a goods collection/delivery information picture in the present embodiment.

DESCRIPTION OF THE PREFERRED EMBODIMENTS

An embodiment of a collection/delivery navigation system for determining and indicating a route through which goods are delivered and collected and for managing collection/delivery conditions will be described hereunder.

Figure 1:
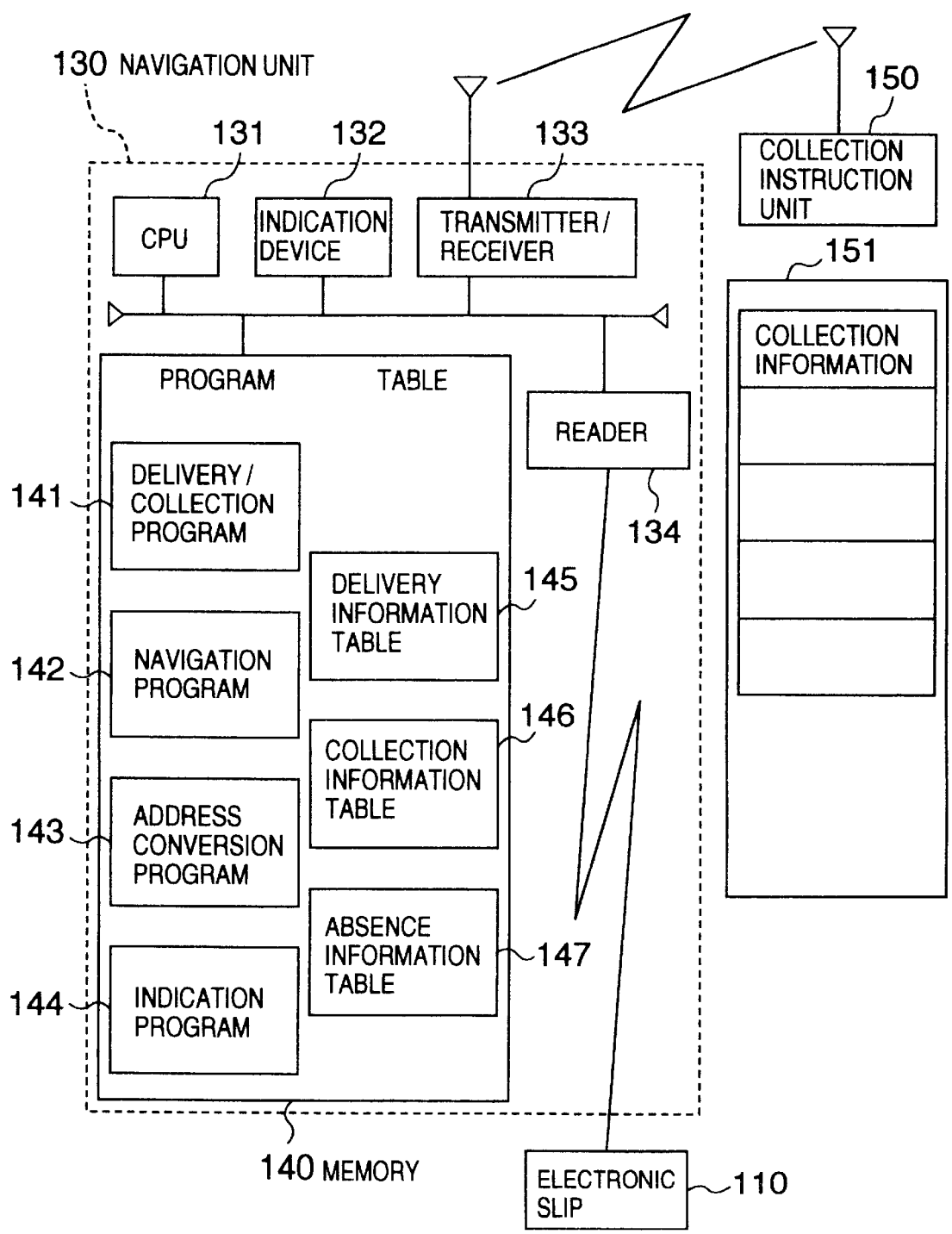
FIG. 1 is a block diagram schematically showing the construction of a collection/delivery navigation system according to an embodiment of the present invention.

Referring to FIG. 1, the collection/delivery navigation system of the present embodiment is schematically constructed as shown therein in block form. The collection/ delivery navigation system of the present embodiment comprises, as shown in FIG. 1, an information reader (detailed later) provided in, for example, a distribution vehicle, an electronic slip 110, attached to individual goods, which stores information described in a slip of a commodity and has a function of transmitting the stored information to the information reader in response to an external request for information, and a navigation unit 130 for generating a route for collection and delivery of goods and a collection and delivery condition table on the basis of the information read out of the electronic slip by means of the reader and for indicating results of generation. The navigation unit 130 receives collection information 151 transmitted from a collection instruction unit 150. The electronic slip 110 has a function similar to that of IC cards and a consignor or a distributor inputs slip information of goods to the electronic slip by using a card write unit.

The navigation unit 130 includes a CPU 131 for controlling the whole of the unit, an indication device 132 for indicating a collection/delivery route, detailed information concerning collection and delivery conditions and goods, a transmitter/receiver 133 having a function of receiving at least collection information 151 from the collection instruction unit 150, a memory 140 for storing programs and goods information tables, and a contactless reader 134 for reading information stored in the electronic slip 110 by using a radio electric wave which is referred to above as the information reader.

The electronic slip 110 stores, detailed information described in a slip of a commodity as it is and including residence address, telephone number, goods names, weight and charge and extracts information necessary for delivery of the commodity from the stored information in response to an inquiry signal from the reader 134 to transmit the extracted information. Alternatively, various kinds of slip information pieces may be held automatically in a collection/distribution center in order that instead of storing various kinds of information without alteration as above, the electronic slip 110 may store only a master code of a goods slip and the distribution center may communicate with the navigation unit by using the master code read out of the contactless reader 134 as a key to obtain detailed information of the slip.

The transmitter/receiver 133 of the navigation unit 130 acquires the collection information 151 by receiving a collection instruction from the collection instruction unit 150 provided in for example, the collection/distribution center through, for example, MCA (multi-channel access) radio or mobile communication such as a portable telephone or through a satellite communication system.

The memory 140 of the navigation unit 130 stores a delivery/collection program 141 for controlling the whole of the collection/delivery process of the navigation unit 130, a navigation program 142 representing collection/delivery route generating means for generating a route for collection and delivery by using information concerning a delivery destination and a collection destination, an address conversion program 143 representing address conversion means for converting address information into position information in terms of longitude and latitude, a delivery information table 145 for storing information necessary for delivery represented by delivery information inclusive of a delivery destination and delivery conditions, a collection information table 146 for storing information necessary for collection represented by collection information inclusive of a collection destination and collection conditions, an absence information table 147 for storing information concerning the absence of the delivery/collection destination due to recipient's absence, and an indication program 144 for indicating detailed information concerning the collection/delivery route, collection/delivery conditions and goods.

Figure 2:
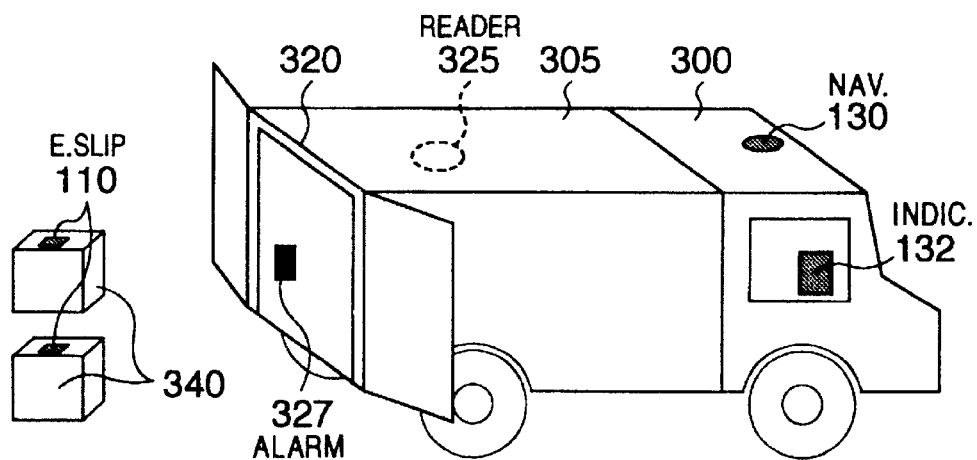
FIG. 2 is a diagram showing the external appearance of the collection/delivery navigation system of the present embodiment.

Referring now to FIG. 2, the external appearance of an on-vehicle collection/delivery navigation system in the present embodiment is shown. As shown in FIG. 2, in the collection/delivery navigation system, goods 340 each attached with an electronic slip 110 are about to be loaded into a luggage compartment 305 of a vehicle 300 for collection and delivery. The vehicle 300 is mounted with a navigation unit 130 (only an antenna is illustrated), contactless readers 320 and 325 for the electronic slip 110, an alarm device 327 such as a buzzer, and an indication device 132 for either picture display on the screen or loudspeaker/earphone indication. Only two commodities 340 and only two electronic slips 110 are depicted in FIG. 2 but actually, there are a larger number of commodities 340 and electronic slips 110.

For the purpose of inputting delivery information to the navigation unit 130 of the vehicle 300, known methods may be used including a method in which when goods or commodities 340 each attached with an electronic slip 110 are loaded into the vehicle 300, electronic slips are read updately by means of the contactless reader 320 provided at the entrance of the luggage compartment 305 of the vehicle 300 and another method in which after goods 340 have been loaded into the vehicle 300, electronic slips are read collectively by means of the contactless reader 325 provided inside the luggage compartment 305 of the vehicle 300.

Figure 3:
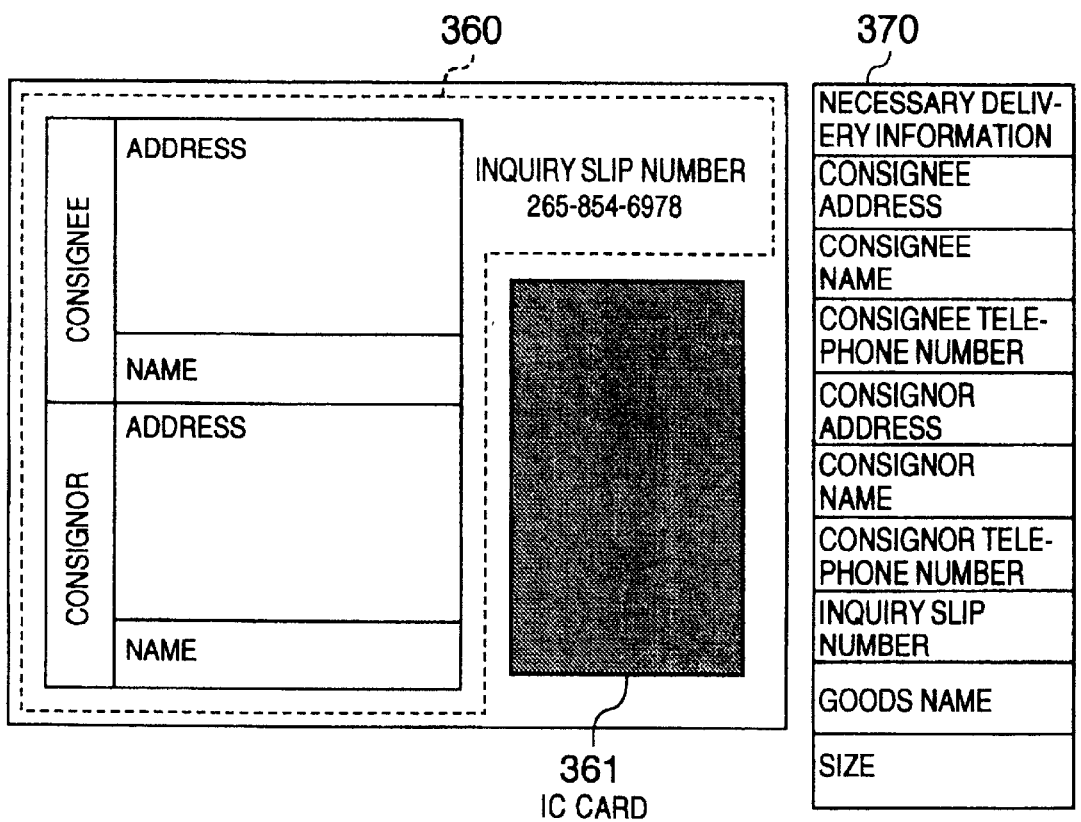
FIG. 3 is a diagram showing an example of an electronic slip in the present embodiment.

An example of the electronic slip 110 in the present embodiment is shown in FIG. 3. The electronic slip 110 in the present embodiment has, as shown in FIG. 3, a letter entry column 360 on a slip and an IC card section 361 in which a thin IC card is attached to the slip. Delivery information 370 necessary for delivery of goods 340 is not only described at the letter entry column 360 but also stored in the IC card section 361 through a known input method.

The delivery information 370 in the electronic slip 110 includes, for example, consignee address, consignee name, consignee telephone number, consignor address, consignor name, consignor telephone number, inquiry slip number, goods name and size, as shown in FIG. 3.

A flow of general work in the collection/delivery system of the present embodiment will now be described with reference to a flow chart of FIG. 4.

Figure 4:
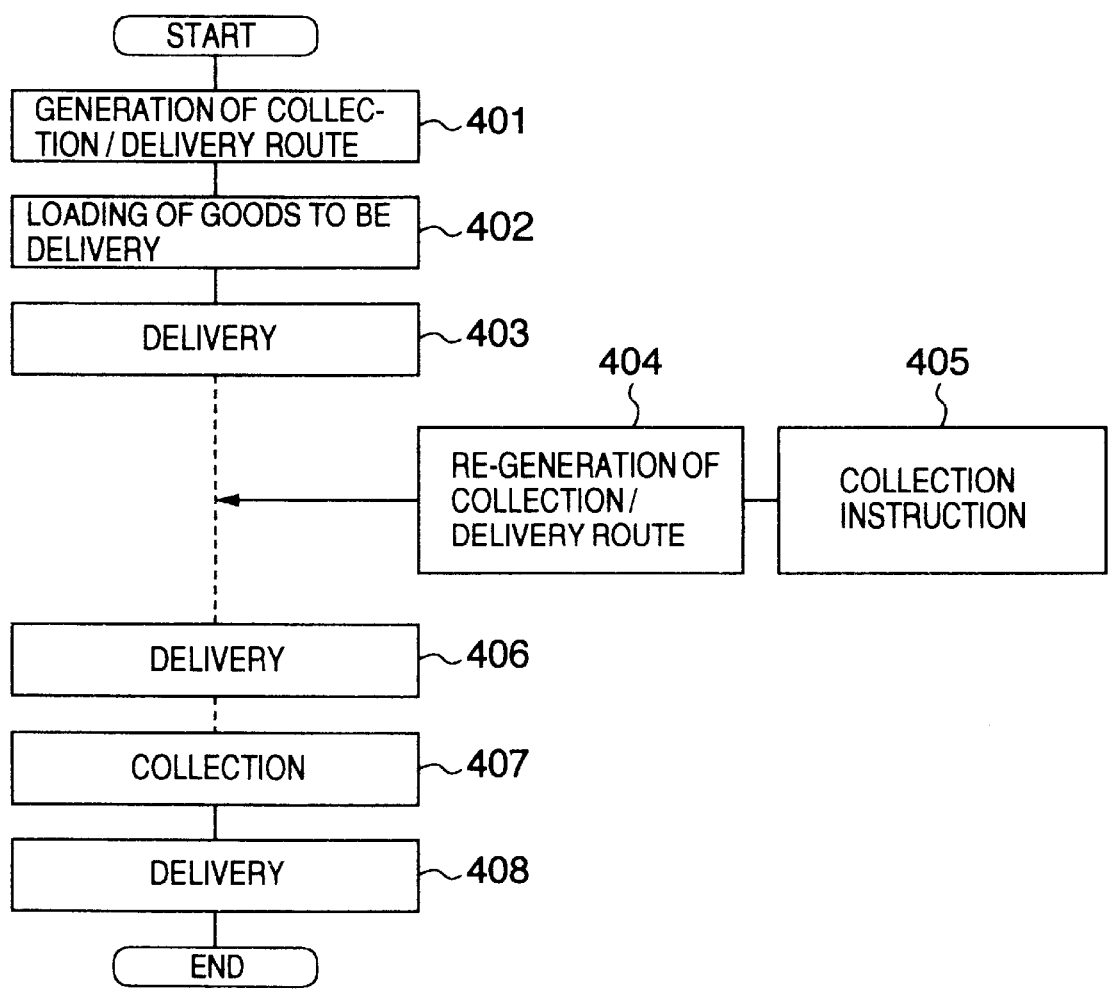
FIG. 4 is a flow chart showing the process procedure of general service in the present embodiment.

In the general work in the present embodiment shown in FIG. 4, a collection/delivery route for the vehicle 300 for collection and delivery is first generated (step 401), goods 340 to be delivered are loaded into the vehicle 300 (step 402) and the goods 340 are delivered (step 403).

When a collection instruction is issued externally (step 405) during the delivery (steps 403 and 406), the navigation unit 130 performs resetting of the collection/delivery route for the vehicle 300 in accordance with the collection instruction (step 404).

Subsequently, goods 340 are delivered (step 406), collection is carried out (step 407) at a site which is instructed for collection in the step 405, and then the remainder of goods 340 are delivered (step 408) to terminate the collection and delivery. The collection instruction is generated as necessary in the course of the collection/delivery work.

Next, the collection/delivery process of goods 340 in the collection/delivery navigation system of the present embodiment will be described in greater detail with reference to a flow chart of FIG. 5.

Figure 5:
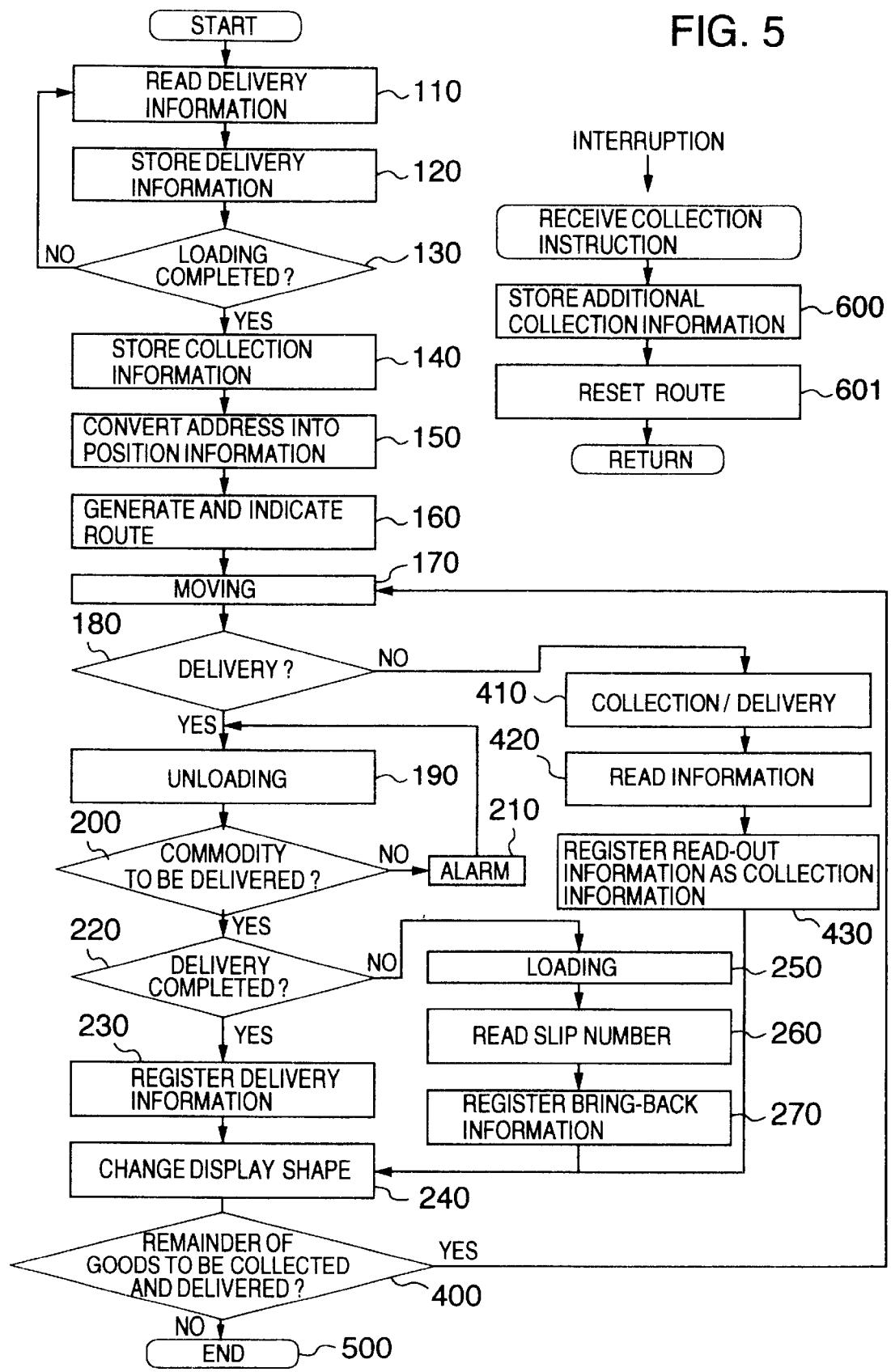
FIG. 5 is a flow chart showing the process procedure of collection and delivery in the present embodiment.

As shown in FIG. 5, in the collection/delivery process, delivery information pieces 370 necessary for delivery are read updately by means of the reader 320 from electronic slips 110 attached to goods 340 to be delivered when the goods 340 are loaded into the luggage compartment 305 (step 110).

After the delivery information 370 has been read out of the electronic slip 110, this delivery information 370 is stored in the delivery information table 145 in the memory 140 of the navigation unit 130 (step 120). This process is repeated until all goods 340 have been loaded (step 130).

In an alternative, after goods 340 have once been loaded into the luggage compartment 305 of the vehicle 300, pieces of delivery information 370 may be read collectively during moving of the vehicle 300 by means of the reader 325 provided inside the luggage compartment 305 of the vehicle 300 and the thus read delivery information pieces 370 may be stored in the delivery information table 145 in the memory 140.

After loading of the goods 340 into the vehicle 300 has been completed, collection information 151 is received from the collection instruction unit 150 through the transmitter/receiver 133 and the received collection information 151 is stored in the collection information table 146 in the memory 140 of the navigation unit 130 (step 140).

Residence address information is extracted from the delivery/collection information stored in the memory 140 and the extracted residence address information is converted into position information in terms of longitude and latitude by using the address conversion program 143 (step 150). The best or optimum collection/delivery route, for example, a collection/delivery route by which collection and delivery can be completed through as short a distance as possible is generated using the known navigation program 142 and the generated collection/delivery route is indicated on the indication device 132 by means of the indication program 144 (step 160).

Figures 6, 7:
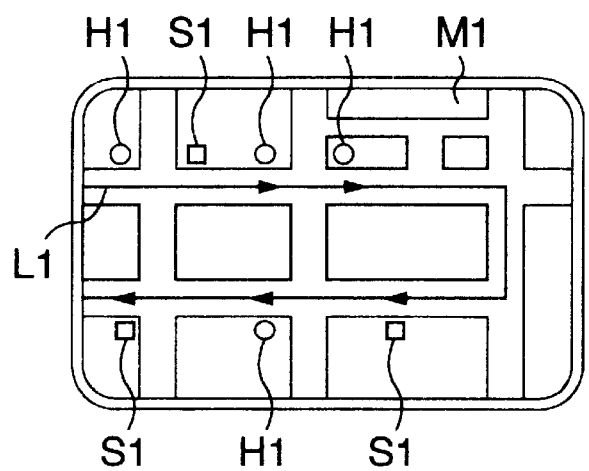
FIG. 6 is a diagram showing an example of display of a collection/delivery route in the present embodiment.
FIG. 7 is a diagram showing an example of a delivery goods information picture in the present embodiment.

Referring to FIG. 6, there is illustrated an example of a collection/delivery route display in the present embodiment. As shown in FIG. 6, in the collection/delivery route display, pieces of position information H1 for scheduled delivery, pieces of position information S1 for scheduled collection and a collection/delivery route L1 are indicated on a map M1 of a collection/delivery area of the indication device 132 provided at the driver's seat of the vehicle 300.

The vehicle 300 is moved along the collection/delivery route L1 (step 170) and upon arrival at a site indicated by the position information H1 for scheduled delivery (180), a slip number of an electronic slip 110 attached to a commodity 340 is read by means of the reader 320 when the commodity 340 is unloaded from the luggage compartment 305 (step 190) to decide whether the commodity 340 is one to be unloaded at that site (step 200).

If the commodity 340 is determined not to be unloaded in the step 200, an alarm is given by means of the alarm device 327 provided near the entrance of the luggage compartment 305 (step 210) and another commodity 340 determined to be unloaded at that site is unloaded (step 190).

It is decided whether the delivery of the commodity 340 to be delivered at that site has been completed (step 220) and if completed, delivery completion information indicative of the delivery conditions is registered in the delivery information table 145 in the memory 140 (step 230) and by using high-light display in which the mark, shape or color in the position information H1 for scheduled delivery displayed on the indication device 132 is changed by means of the indication program 144, the completion of the delivery is informed to the distributor (step 240).

If the commodity 340 is to be brought back because of, for example, the absence of the recipient, the commodity 340 must be managed for re-loading into the luggage compartment 305 and bring-back goods (step 250). In that case, the slip number is read out of the electronic slip 110 (step 260), bring-back information concerning the absence of the delivery/collection destination is registered in the absence information table 147 in the memory 140 (step 270), and the absence of the delivery destination is informed to the distributor by an absence indication in which the mark, shape or color in the position information H1 for scheduled delivery displayed on the indication device 132 is changed by means of the indication program 144 (step 240), thereby ensuring that the delivery conditions of the commodity 340 can be managed even when the delivery is not allowed to be completed because of the absence of the recipient.

If the arrival site in the step 180 is a site indicated by position information S1 for scheduled collection, a slip number is read out of an electronic slip 110 attached to a commodity 340 (step 420) when the commodity 340 is collected and loaded into the luggage compartment 305 (step 410) and is registered, as collection information 151, in the collection information table 146 in the memory 140 (step 430), and the completion of the collection is informed to the distributor by a collection completion indication in which the mark, shape or color in the position information S1 for scheduled collection displayed on the indication device 132 is changed (step 240).

Subsequently, by using the delivery conditions stored in the delivery information table 145, the collection conditions stored in the collection information table 146 and the information indicative of the absence of the delivery/collection destination stored in the absence information table 147, the navigator decides whether the delivery and collection is completed.

In the collection/delivery navigation system of the present embodiment, the mark, shape or color in the position information H1 for scheduled delivery or the position information S1 for scheduled collection displayed on the indication device 132 is changed by means of the indication program 144 and therefore, the distributor in charge of the collection and delivery of goods 340 can know, from the indication on the indication device 132, whether the delivery is completed.

Then, the distributor decides, from an indication on the indication device 132, whether there remain goods 340 to be collected and delivered (step 400) and in the absence of any remaining goods, the collection/delivery service is completed (step 500). In the presence of any remaining goods 340 to be collected and delivered, the vehicle 300 is moved (step 170) to continue the collection/delivery service.

When an addition of collection is generated in the course of the collection/delivery service, a collection instruction is transmitted from the collection instruction unit 150 at a desired timing within the time interval during which the collection/delivery process is carried out in the steps 140 to 400, so that the collection information 151 is received by the transmitter/receiver 133 and added to the collection information table 146 in the memory 140 (step 600), and the delivery and collection information pieces stored in the delivery information table 145 and collection information table 146 in the memory 140 are extracted to again generate a collection/delivery route (step 601).

Here, the addition process of the collection information 151 and the resetting process of the collection/delivery route are carried out through an interruption process and when the addition and resetting processes have been completed, the program returns to the process which is executed before the generation of the interruption.

When the distributor desires to know detailed information concerning goods 340 to be delivered or collected, the indication device 132 is operated by the distributor to designate the position information, so that the indication program 144 consults delivery information 370 stored in the delivery information table 145 and collection information 151 stored in the collection information table 146 to indicate detailed information of the goods 240 on the indication device 132.

An example of a delivering goods information picture in the present embodiment is shown in FIG. 7. As shown in FIG. 7, in the delivering goods information picture, an example of detailed information about a commodity 340 to be delivered is depicted including, in this example, address, name and telephone number of a delivery destination, name and weight of the commodity and notes.

An example of a collecting goods information picture in the present embodiment is shown in FIG. 8. As shown in FIG. 8, in the collecting goods information picture, an example of detailed information about a commodity 340 to be collected is depicted including, in this example, address, name and telephone number of a collection destination, name and weight of the commodity and notes.

By indicating the delivering goods information picture of FIG. 7 and the collecting goods information picture of FIG. 8, the distributor confirms the correct address inclusive of name of a building at the delivery/collection destination and telephone number of the recipient through the medium of the indication device 132 provided near the driver's seat, thus making it possible to perform correct collection and delivery in an area where buildings are crowded and pre-contact with a recipient who utilizes a mobile telephone such as a portable telephone or a PHS and to obtain a clue to searching a commodity 340 by watching a slip inside the luggage compartment 305.

Further, by operating the indication device 132 to cause the indication program 144 to consult delivery conditions stored in the delivery information table 145, collection conditions stored in the collection information table 146 and information concerning the absence of delivery and collection destinations stored in the absence information table 147, information concerning collection/delivery conditions for goods 340 as shown in FIG. 9 can be indicated on the indication device 132.

Referring to FIG. 9, an example of a goods collection/delivery information picture in the present embodiment is shown. Indicated in the picture is an example of information concerning collection and delivery of goods 340, including slip numbers of goods 340 to be collected and delivered, addresses, names, telephone numbers of collection and delivery destinations and collection/delivery conditions inclusive of delivery completion and bring-back goods due to the absence.

The collection/delivery service support program as shown in FIG. 5 including the collection/delivery navigation according to the present invention can be stored in a recording medium, not shown, such as a CD-ROM or a DVD-RAM. For example, by providing the navigation unit 130 with an OS called Windows CE (trade name), installing the program of the recording medium on the navigation unit and executing the program, management of the previously-described collection/delivery service can be realized. The collection/delivery route information, the delivery information and the collection information generated in the navigation unit 130 can also be transmitted to the collection/distribution center, in addition to the devices giving a display and a voice indication to the distributor, through the transmitter/receiver 133 so as to be used for, for example, designated time collection/delivery management and over-load support management.

As described above, in the collection/delivery navigation system of the present embodiment, information required by the distributor and including a collection/delivery route for goods, detailed information such as residence address and contact address and delivery and collection conditions can be offered in conformity with two modes of service of collection and delivery and hence, erroneous delivery of goods, missing delivery and missing collection can be avoided to greatly improve the efficiency of collection of goods.

While the present invention has been described concretely by way of the foregoing embodiments, the present invention is in no way limited thereto and can obviously be altered and modified in various ways without departing from the gist of the invention.

What is claimed is:

1. A navigation unit for indicating a route for collection and delivery of a commodity and collection and delivery conditions, said navigation unit comprising:
   a reader for reading information stored in an electronic slip, which stores information of the commodity and has a function of transmitting the stored information in response to an external request for information;
   a delivery information table for storing delivery information inclusive of a delivery destination and delivery conditions;
   a collection information table for storing collection information inclusive of a collection destination and collection conditions;
   collection/delivery route generation means for generating information concerning a route, through which the collection and delivery is carried out, by using said delivery information and said collection information; and
   address conversion means for converting address information into position information in terms of longitude and latitude, wherein said address conversion means converts address information in said delivery information and collection information into position information in terms of longitude and latitude, and said collection/delivery route generation means generates a route for collection and delivery by using said position information in terms of longitude and latitude.

2. A navigation unit for indicating a route for collection and delivery of the commodity and collection and delivery conditions, said navigation unit comprising:
   a reader for reading information stored in an electronic slip, which stores information of a commodity and has a function of transmitting the stored information in response to an external request for information;
   a delivery information table for storing delivery information inclusive of a delivery destination and delivery conditions;
   a collection information table for storing collection information inclusive of a collection destination and collection conditions;
   collection/delivery route generation means for generating information concerning a route, through which the collection and delivery is carried out, by using said delivery information and said collection information; and
   an absence information table for storing information concerning the absence of a delivery/collection destination due to recipient's absence, wherein completion of delivery is decided based on the information concerning the absence of delivery/collection destination stored in said absence information table, the delivery conditions stored in said delivery information table and the collection conditions stored in said collection information table.

3. A navigation unit for indicating a route for collection and delivery of a commodity and collection and delivery conditions, said navigation unit comprising:
   a reader for reading information stored in an electronic slip, which stores information of the commodity and has a function of transmitting the stored information in response to an external request for information;
   a delivery information table for storing delivery information inclusive of a delivery destination and delivery conditions;
   a collection information table for storing collection information inclusive of a collection destination and collection conditions;
   collection/delivery route generation means for generating information concerning a route, through which the collection and delivery is carried out, by using said delivery information and said collection information;
   a receiver for receiving external collection information; and
   resetting means for resetting the route for collection and delivery by using the collection information received by said receiver, the delivery information stored in said delivery information table and the collection information stored in said collection information table.

4. A navigation unit for indicating a route for collection and delivery of the commodity and collection and delivery conditions, said navigation unit comprising:
   a reader for reading information stored in an electronic slip, which stores information of the commodity and has a function of transmitting the stored information in response to an external request for information;
   a delivery information table for storing delivery information inclusive of a delivery destination and delivery conditions;
   a collection information table for storing collection information inclusive of a collection destination and collection conditions;
   collection/delivery route generation means for generating information concerning a route, through which the collection and delivery is carried out, by using said delivery information and said collection information;
   address conversion means for converting address information into position information in terms of longitude and latitude, wherein said address conversion means converts address information in said delivery information and collection information into position information in terms of longitude and latitude, and said collection/delivery route generation means generates a route for collection and delivery by using said position information in terms of longitude and latitude;
   an absence information table for storing information concerning the absence of delivery/collection destination due to recipient's absence, wherein completion of delivery is decided based on the information concerning the absence of delivery/collection destination stored in said absence information table, the delivery conditions stored in said delivery information table and the collection conditions stored in said collection information table; and
   a receiver for receiving external collection information and resetting means for resetting the route for collection and delivery by using the collection information received by said receiver, the delivery information stored in said delivery information table and the collection information stored in said collection information table.

* * * * *